(12) United States Patent
Bertolli et al.

(10) Patent No.: US 12,190,464 B2
(45) Date of Patent: Jan. 7, 2025

(54) PROCESS FOR THE ALIGNMENT OF VIRTUAL CONTENT IN PHYSICAL ENVIRONMENTS

(71) Applicant: Avrio Analytics LLC, Knoxville, TN (US)

(72) Inventors: Michael Bertolli, Knoxville, TN (US); Alicia Caputo, Knoxville, TN (US)

(73) Assignee: Avrio Analytics LLC, Knoxville, TN (US)

( * ) Notice: Subject to any disclaimer, the term of this patent is extended or adjusted under 35 U.S.C. 154(b) by 0 days.

(21) Appl. No.: 18/602,938

(22) Filed: Mar. 12, 2024

(65) Prior Publication Data
US 2024/0312171 A1    Sep. 19, 2024

Related U.S. Application Data

(60) Provisional application No. 63/489,854, filed on Mar. 13, 2023.

(51) Int. Cl.
*G06T 19/20* (2011.01)
*G06T 19/00* (2011.01)

(52) U.S. Cl.
CPC ............ *G06T 19/20* (2013.01); *G06T 19/006* (2013.01); *G06T 2219/2004* (2013.01)

(58) Field of Classification Search
CPC .............................. G06T 19/006; G06T 19/20
See application file for complete search history.

(56) References Cited

U.S. PATENT DOCUMENTS

| | | | |
|---|---|---|---|
| 2015/0243158 A1* | 8/2015 | Bassan-Eskenazi ... | G08B 21/24 340/539.32 |
| 2017/0365102 A1* | 12/2017 | Huston .................... | A63F 13/65 |
| 2019/0051054 A1* | 2/2019 | Jovanovic ........... | G06F 3/04815 |
| 2021/0027539 A1* | 1/2021 | Huang .................... | G06T 7/194 |

* cited by examiner

*Primary Examiner* — Charles Tseng
(74) *Attorney, Agent, or Firm* — Chambliss, Bahner & Stophel, P.C.; Stephen D. Adams (57) ABSTRACT

A method for aligning extended reality (XR) content with a physical environment by, first, identifying a first elongate intersection between two physical surfaces. Then, an intersection point of a XR model is located along the first elongate intersection.

22 Claims, 5 Drawing Sheets

PROCESS FOR THE ALIGNMENT OF VIRTUAL CONTENT IN PHYSICAL ENVIRONMENTS

CROSS-REFERENCE TO RELATED APPLICATIONS

This application claims the benefit of U.S. Provisional Application No. 63/489,854 filed Mar. 13, 2023, and entitled HIGH-ACCURACY ADVANCED ALIGNMENT OF VIRTUAL CONTENT IN PHYSICAL ENVIRONMENTS, which is incorporated herein by reference in its entirety.

FIELD

This invention relates generally to systems and methods for aligning and tracking physical objects in virtual reality environments, augmented reality environments, mixed reality, and extended reality environments for one or more users across multiple coordinate systems.

BACKGROUND

Virtual reality (VR), augmented reality (AR), mixed reality (MR), and extended reality (XR) systems (collectively and individually, each an "XR" system unless specifically expressed otherwise), as further defined below, are helpful in providing realistic training, entertainment, and other experiences. In these systems, it is often necessary or desired to align real-world objects, structures, environments with computer-generated objects, structures, environments. Accurate alignment is often a necessary or desired component of XR systems for several reasons, including for safety (e.g., alerting a user when they are about to collide with a wall or piece of furniture). In addition to safety, correctly aligning the physical and virtual environments allows a user to correctly and accurately interact with the XR content. This alignment allows, for example, a computer-generated vase or candlestick to be accurately and correctly placed onto a real-world table in an XR environment. In another example, proper alignment allows a user to walk through a XR door that is created in a real-world warehouse. In another example, when properly aligned, a virtual "corner" of a building is in the same position and orientation as the corresponding physical corner in the real world. In yet another example, proper alignment allows two users to accurately and correctly orient themselves within a computer-generated environment and for one user's position within that environment to be correctly rendered for the other user. As such, XR systems often employ a knowledge of a user's physical surroundings to provide immersive interactions with virtual content, including by aligning the virtual structures with corresponding physical structures.

Conventionally, alignment of virtual content in physical spaces is difficulty and fraught with uncertainty (e.g., misalignment). According to certain current methods, a user "tags" one or more alignment anchors within an XR system using an XR peripheral (e.g., a controller) or a visual/physical anchor located within a space (e.g., a QR code) using an imaging device (e.g., a smartphone camera). In this process, a number of errors are common, including user error, systematic errors, and statistical errors. Due to the presence of these errors, highly accurate alignment is often nearly impossible. Furthermore, over large distances, these errors and misalignments are magnified, which results in a truly difficult process for accurately aligning large-scale (e.g., building-sized) XR content in physical environments. Additionally, multiplayer alignment, where devices must align to the same physical space across varying device-specific coordinate systems, have compounded errors (i.e., each device's anchoring contributes more uncertainty to the alignment) and profound end-user issues (e.g., two players looking at different physical locations for virtual content that should be in the same physical place).

In general, the process of using "fiducial markers" for the alignment of physical objects or locations with XR objects or locations (i.e., objects or locations that are used as a point of reference or a measure, such as to provide the alignment of XR content to a physical space) often uses one or more methods such as visual odometry/computer vision (e.g., QR codes) or spatial anchors tagged by the user (e.g., using the controller) where the location of such anchors is derived from the system's spatial localization algorithm (e.g., from "Simultaneous Localization and Mapping" or "SLAM", which uses a combination of sensors and accelerometers). Current methods leverage statistical methods to reduce or mitigate uncertainty (i.e., "statistical mitigation"), such as averaging over multiple QR codes, or applying Kalman Filters to sensor readings.

However, current fiducial approaches have systematic uncertainty that, in practice, would be very difficult to overcome by statistics (i.e., an infinite number of samples will not provide infinitesimal uncertainty). This is compounded by coordination of alignments across multiple devices, where each device may have variations in both systematic and statistical uncertainty from each other. Even in the best-case scenario where no statistical uncertainty is present (e.g., the sample is exactly equal to population), devices will still have systematic uncertainty resulting from the hardware and/or software intrinsics of the device (e.g., systematic uncertainty resulting from the SLAM algorithm as well as from each of the related sensors and their system for collection). Additionally, uncertainty introduced by the user, in practice, cannot be easily eliminated using current methods (e.g., angle of viewing a QR code, accuracy of tagging a specific location), introducing another source of both systematic and statistical uncertainty.

Importantly, these conventional methods are, in general, used only over small distances (e.g., room scale, 10'×10', or views of larger scales from a distance such as viewing construction in a stationary location). It should be noted that, at large distances, especially large distances with up-close viewing (e.g., aligning an entire building at one room and applications where users will traverse the entire building), not only are uncertainties more impactful, but systematic uncertainties can dominate over statistical uncertainties, rendering statistical mitigation useless.

The currently-disclosed systems and methods described below seek to address at least some of the problems described above that impact XR systems, environments, and methods of use.

NOTES ON CONSTRUCTION

The use of the terms "a", "an", "the" and similar terms in the context of describing embodiments of the invention are to be construed to cover both the singular and the plural, unless otherwise indicated herein or clearly contradicted by context. The terms "comprising", "having", "including" and "containing" are to be construed as open-ended terms (i.e., meaning "including, but not limited to,") unless otherwise noted. The terms "substantially", "generally" and other words of degree are relative modifiers intended to indicate permissible variation from the characteristic so modified.

The use of such terms in describing a physical or functional characteristic of the invention is not intended to limit such characteristic to the absolute value which the term modifies, but rather to provide an approximation of the value of such physical or functional characteristic.

The use of any and all examples or exemplary language (e.g., "such as" and "preferably") herein is intended merely to better illuminate the invention and the preferred embodiments thereof, and not to place a limitation on the scope of the invention. Nothing in the specification should be construed as indicating any element as essential to the practice of the invention unless so stated with specificity.

A virtual reality ("VR") environment is one that provides total immersion of the user without introducing elements of the user's actual environment. Any interactions occur entirely within the virtual environment and not within the physical world. Typically, a VR environment is created using computer-generated or real images. Peripherals, such as gloves, goggles, controllers, etc. (i.e., "peripherals"), detect the user's movements, typically including movement of the user's head and hands, translate that movement into the virtual environment to allow the user to interact with the VR environment. On the other hand, an AR environment is one where data (e.g., computer-generated experiences, information, etc.) are overlaid onto the physical world, but where all interactions occur within the physical world. Typically, AR environments use a display screen, glasses, goggles, etc. to present the data. A mixed reality ("MR") environment is essentially a combination of VR and AR environments, where virtual objects are integrated and interact with the physical world in real time. Like VR, XR peripherals may also be used in connection with XR environments, which devices are typically specifically manufactured for direct connectivity and interaction with the environment created. Finally, an extended reality ("XR") is used as an umbrella or catchall term that includes AR, VR, MR. In the description that follows, the term "XR" or the phrase "extended reality" may be used to refer to any of AR, VR, or XR unless otherwise specifically noted.

The term "XR system" refers to the computer, machine, etc. that generates the virtual content or experience for an XR environment. Additionally, the term "peripheral" or "XR peripheral" is used to refer to the tools (e.g., gloves, goggles, helmets, etc.) that a user might employ to view and interact with that XR environment.

As discussed above, the present invention relates to systems and methods involving combinations and interactions of real structures and environments with computer-generated, virtual, or XR content. It should be appreciated, therefore, that virtual content does not actually interact (e.g., contact, intersect, abut, etc.) with real world or physical content. However, in this disclosure, the use of terms such as "interact", "intersect", "correspond", etc., when referencing interactions between XR content and real-world environments and content, means that they are defined as occupying a position, orientation, etc. in space that, if both were real, would actually interact, intersect, correspond, etc. For example, a virtual plane "intersects" a real wall when, if the virtual plane were real, it would actually intersect the real wall. Likewise, a virtual point of interest is located at a position that "corresponds" to a location on a real wall when, if the virtual point of interest were real, it would actually be located at that location on the real wall.

SUMMARY

The above and other problems are addressed by a method for aligning extended reality (XR) content with a physical environment. In certain implementations, the method includes providing a physical environment having a first physical surface and a second physical surface. The method may also include the step of providing a first projected surface that is co-planar with the first physical surface and a second projected surface that is co-planar the second physical surface, wherein the first and second projected surfaces intersect with one another along a first elongate intersection. Then, using an XR generation system, generating an XR model having a first virtual surface, a second virtual surface, and a virtual intersecting plane. Next, a selected intersecting plane is provided. Finally, a position and orientation are assigned to the XR model such that the first virtual surface is co-planar with the first physical surface, the second virtual surface is co-planar with the second physical surface, the virtual intersecting plane intersects with the first virtual surface along a fourth elongate intersection and intersects with the second virtual surface along a fifth elongate intersection, and an intersection point is located at an intersection of the fourth elongate intersection with the fifth intersection, such that the intersection point is disposed along the first elongate intersection.

In another implementation, the present invention also provides a method for aligning extended reality (XR) content with a physical environment having a first physical surface, a second physical surface, a selected intersecting plane, a first projected surface that is co-planar with the first physical surface, and a second projected surface that is co-planar with the second physical surface, wherein the first and second projected surfaces intersect with one another along a first elongate intersection, the first physical surface and the selected intersecting plane intersect with one another along a second elongate intersection, and the second physical surface and the selected intersecting plane intersect with one another along a third elongate intersection. The method includes the step of, using an XR generation system, generating an XR model having a first line that is assigned a position and orientation to be represented as coplanar with the first physical surface and a second line that is assigned a position and orientation to be represented as coplanar with second physical surface. Next, the method may include the step of projecting the first line onto a virtual intersecting plane to provide a first intersecting line having a position and orientation to be represented as coplanar with the first physical surface and projecting the second line onto the virtual intersecting plane to provide a second intersecting line having a position and orientation to be coplanar with the second physical surface. Finally, the method includes defining an intersection point located at an intersection of the first intersecting line with the second intersecting line, wherein the intersection point has a position and orientation to be represented as disposed on the first elongate intersection of the physical environment.

In another implementation, the present invention also provides a method for aligning extended reality (XR) content with a physical environment. The method includes providing an X axis, a Y axis, a Z axis, an XY plane defined by the X axis and Y axis, a XZ plane defined by the X axis and the Z axis, and a YZ plane defined by the Y axis and the Z axis. Next, the method includes providing a first physical plane that is parallel with the XY plane and providing a second physical plane that is parallel with an YZ plane and that intersects the first physical plane along a first elongate intersection. Next, using an XR generation system, a XR model is generated. The XR model has a selected intersecting plane defined as intersecting the first physical plane along a second elongate intersection and as intersecting the second physical plane along a third elongate intersection, points A1 and A2 that each has a position defined as co-planar with the first physical plane, and points B1 and B2 that each has a position defined as co-planar with the second physical plane. Next, in the XR model and using an XR generation system, the method includes defining a virtual line A that extends through points A1 and A2 such that line A is co-planar with the first physical plane, defining a virtual line B that extends through points B1 and B2 such that line B is co-planar with the second physical plane, optionally projecting line A and line B onto the selected intersecting plane to provide line AP and line BP, respectively, defining an intersection point at an intersection between line AP and line BP, and aligning the model with the physical environment such that the intersection point is co-linear with the first elongate intersection.

BRIEF DESCRIPTION OF THE DRAWINGS

Further advantages of the invention are apparent by reference to the detailed description when considered in conjunction with the figures, which are not to scale so as to more clearly show the details, wherein like reference numerals represent like elements throughout the several views, and wherein.

DETAILED DESCRIPTION

The following description provides non-limiting exemplary implementations of the methods of the present invention. These methods may be used for identifying three-dimensional positions in space in order to align physical and virtual spaces or objects with one another. Many of the cases described below illustrate these concepts using architectural or floorplan drawings. In those cases, other users or objects may be aligned using portions of the building, etc. as reference points. However, the methods of the present invention may be used much more broadly, including any time XR content and physical environments, users, objects, etc. are to be aligned with one another, and should not be understood as being limited to alignment using buildings, floorplans, etc.

Figure 1:
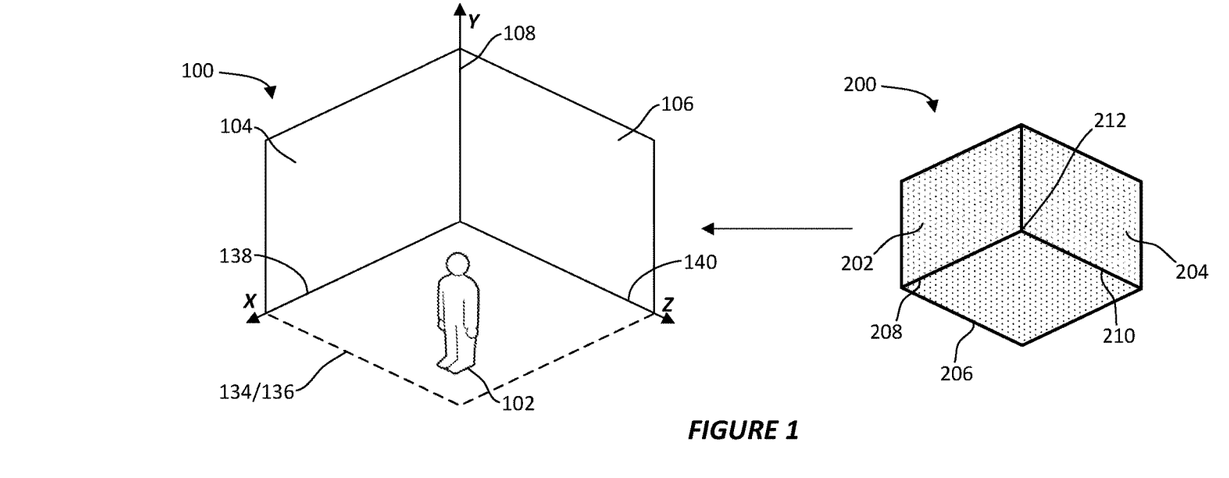
FIG. 1 depicts a physical environment and an XR model that are intended to be aligned using a method of the present invention.

Now, with initial reference to FIG. 1, in a hypothetical physical environment 100 having a first physical surface 104 and a second physical surface 106 is intended to be aligned by a user 102 with a computer-generated XR environment or model 200 having a first virtual surface 202, a second virtual surface 204, and a virtual intersecting plane 206. The methods disclosed below provide a means for making this alignment in a much more accurate fashion compared to conventional alignment methods. In particular, in aligning physical environment 100 with model 200, the presently described methods use a minimal number of points defined in a physical space to provide a unique position and orientation without reliance on uncertain user input, statistical algorithms (e.g., SLAM) or other spatial positioning, visual odometry or computer vision, or large arrays of sensors. These points act as robust fiducials (i.e., a fixed basis or point of comparison) to provide mathematics that is both necessary and sufficient for deriving alignment with closed-form, analytical solutions that minimize uncertainty. Certain methods described herein require two points on each of two surfaces, such that there exists two intersecting planes, each of which contains one of the sets of two points. These four points in space can be chosen by any method, including current tagging/anchoring methodologies (e.g., QR codes, visual tracking, controller position). However, preferably, extremely simple methods (e.g., time-of-flight, depth sensing, positional sensing) can be used to identify the points, thereby minimizing the sensors and algorithms necessary for tagging, positioning, or identifying the location of these points.

Now, in certain embodiments, the first physical surface 104 and the second physical surface 106 intersect with one another along a first elongate intersection 108. In the illustrated case, the first physical surface 104 and the second physical surface 106 are each physical walls that intersect with one another at an intersection (e.g., corner 108). Accordingly, in this example, the first physical surface 104 is defined as being positioned to the left of the corner 106 (as seen in FIG. 1) and the second physical surface 106 is defined as being positioned to the right of the corner.

Figure 2:
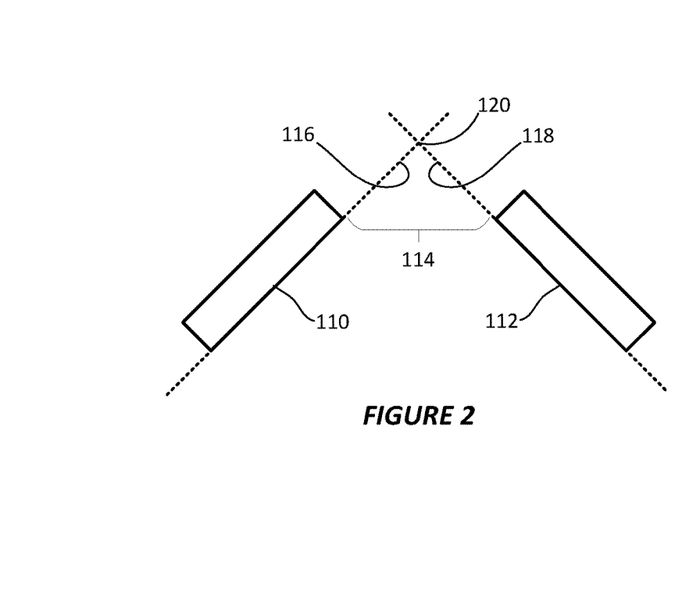
FIG. 2 depicts an example corner of a physical environment formed by two non-intersecting walls and projected surfaces forming a projected intersection.

In certain cases, however, the physical surfaces of the physical environment 100 may not clearly, physically intersect one another at an intersection 108 as in the case discussed above. This might be the case, for example, as depicted in FIG. 2, with a pair of non-intersecting angled wall segments, including first wall segment 110 and second wall segment 112 that provide an opening 114 between them for a door, window, etc. In such cases, each of the wall segments 110, 112 can be projected to provide projected surfaces (i.e., planes), which may be a projected surface, that are each co-planar with the inner surface of one the wall segments and that intersect with one another. In particular, a first projected surface 116 is provided and is co-planar with the inner surface of first wall segment and a second projected surface 118 is provided and is co-planar with the inner surface of second wall segment. While first wall segment 108 and second wall segment 110 do not intersect, the first projected surface 114 and second projected surface 116 intersect at projected intersection 120, which is not located on or within either wall segment 108, 110.

Figure 3:
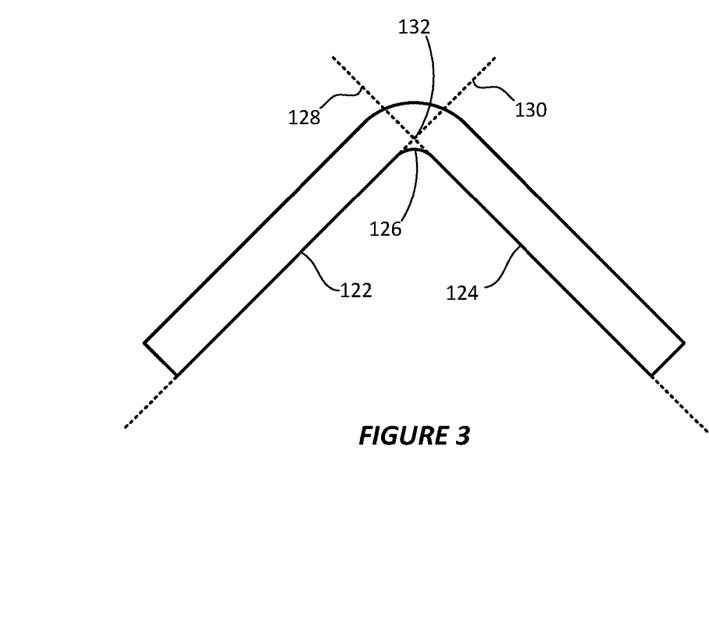
FIG. 3 depicts an example corner of a physical environment formed by a continuously curved wall and projected surfaces forming a projected intersection.

In other cases, intersecting walls may still not provide a clear "intersection" between them. For example, as shown in FIG. 3, a continuous wall providing a first wall segment 122 that is joined continuously with a second wall segment 124 by a curved intersection 126 does not provide a clear intersection between them. As before, in such cases, each of the wall segments 122, 124 can be projected to provide projected surfaces that are each co-planar with the inner surface of one the wall segments and that intersect with one another. In particular, first wall segment 122 is projected to provide first projected surface 128 that is co-planar with the inner surface of first wall segment and second wall segment 124 is projected to provide second projected surface 130 that is co-planar with the inner surface of second wall segment. While first wall segment 122 and second wall segment 124 do not clearly intersect, the first projected surface 128 and second projected surface 130 intersect at projected intersection 132, which is located within the continuous wall.

In the cases illustrated above, the projected surfaces are co-planar with the inner surface of the relevant wall segments because the relevant intersection point of the selected "corner" is an inside corner. In other cases, the projected surfaces may be placed in other positions, including at other depths, with respect to the wall or wall segments. For example, if the selected "corner" is an outside corner, the projected surfaces would be co-planar with an outer surface of the relevant wall segments.

Figure 4:
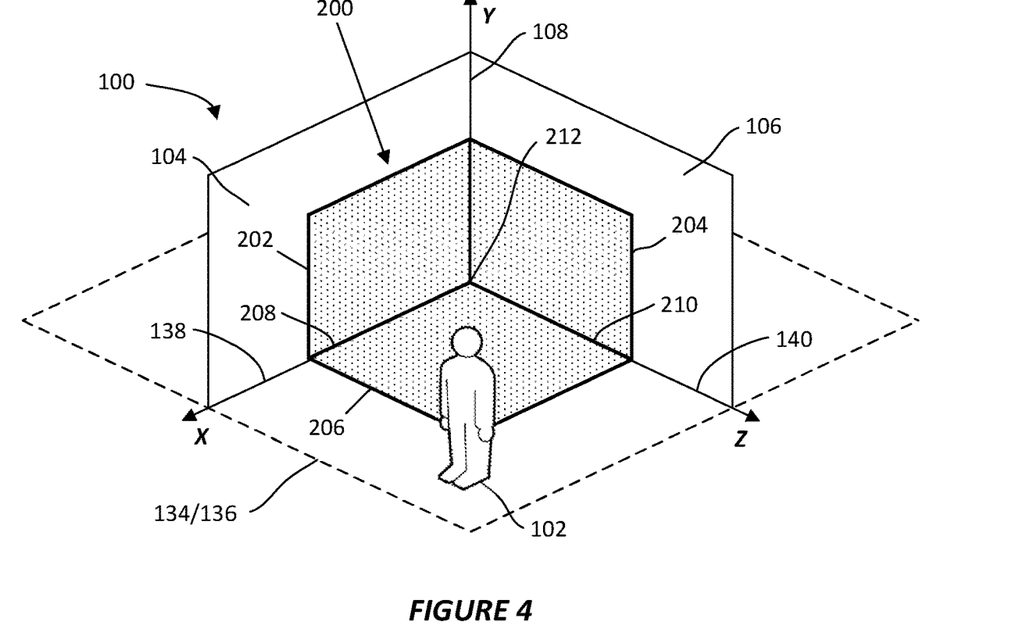
FIG. 4 depicts a physical environment that has been aligned with XR model according to a method of the present invention.

Next, returning to FIG. 1 and with reference to FIG. 4, while not necessary in every embodiment of the present invention, in certain embodiments, the method further includes providing a physical environment 100 having selected intersecting plane 134. This selected intersecting plane 134 is used in aligning the physical environment 100 and the model 200 at a specific and selected vertical position relative to one another. In this embodiment, an arbitrary Cartesian coordinate system is provided, which coordinate system includes an X-axis, Y-axis, and Z-axis, where the Y-axis is aligned to the "vertical" direction. Additionally, movement in the direction of the "Y" arrow is designated as "up" (i.e., opposite the direction of gravity), and movement in the direction opposite the "Y" arrow is designated as "down." As such, each of the axes (i.e., x-axis, y-axis, and z-axis) are orthogonal to one another.

In certain cases, including in the embodiment illustrated in FIG. 1, the selected intersecting plane 134 may correspond to another intersecting plane 136, which may be a ground or floor surface. However, in other cases, the selected intersecting plane 134 may correspond to a ceiling or to another arbitrarily-selected plane that may be placed anywhere in the physical environment 100. The selected intersecting plane 134 may be a physical plane (i.e., one that exists in physical space) or may be non-physical (i.e., a hypothetical or imaginary plane). In each case where a selected intersecting plane 134 is provided, the first physical surface 104 and the selected intersecting plane intersect with one another along a second elongate intersection 138 and the second physical surface 106 and the selected intersecting plane intersect with one another along a third elongate intersection 140. As such, the first elongate intersection 108 is oriented in a first orientation (i.e., parallel with the Y-axis in this illustrated embodiment), the second elongate intersection 138 is oriented in a second orientation (i.e., parallel with the X-axis in this illustrated embodiment), and the third elongate intersection 140 is oriented in a third orientation (i.e., parallel with the Z-axis in this illustrated embodiment).

Similarly, the virtual intersecting plane 206 of model 200 intersects with the first virtual surface 202 along a fourth elongate intersection 208 and intersects with the second virtual surface 204 along a fifth elongate intersection 210.

Using a computer-based XR generation system, the model 200 is assigned a position and orientation such that the first virtual surface 202 is co-planar with the first physical surface 104 and the second virtual surface 204 is co-planar with the second physical surface 106. As such, after aligning the virtual surfaces 202, 204 with the physical surfaces 104, 106, respectively, in this manner, an intersection point 212 of model 200, where the fourth elongate intersection 208 intersects with the fifth elongate intersection 210, is disposed along the first elongate intersection 108. As noted above, in FIG. 4, selected intersecting plane 134 may be placed, such as by the tagging procedure discussed earlier, such that it corresponds to a ground or floor surface of physical environment 100 and virtual intersecting plane 206 is co-planar with the selected intersecting plane. As such, the intersection point 212 is not only disposed along the first elongate intersection 108 of physical environment 100 but is also co-planar with the floor 136 and selected intersecting plane 134. Accordingly, this method aligns the model 200 with the physical environment 100 in the XY, YZ, and XZ planes.

Figure 5:
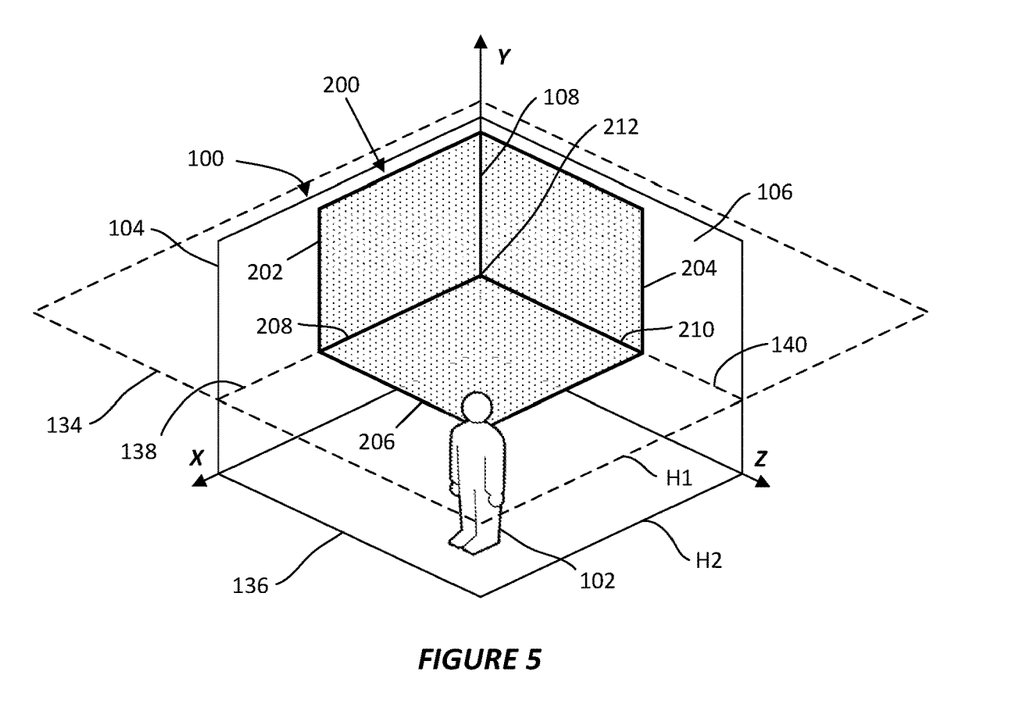
FIG. 5 depicts a physical environment that has been aligned with XR model according to an alternative method of the present invention.

However, in other embodiments, including the embodiment shown in FIG. 5, the selected intersecting plane 134 is not co-planar with the floor 136. Instead, the selected intersecting plane 134 is located at a first height H1 (measured along the Y-axis) and the floor 136 is located at a second height H2 (measured along the Y-axis) that is positioned vertically below height H1. Accordingly, in this embodiment, the selected intersecting plane 134 is located vertically above the floor 136. Thus, by following the same alignment process above, the intersection point 212 is still disposed on the first elongate intersection 108 of physical environment 100 but is not co-planar with the floor 136 at height H2; instead, the intersection point is located above the floor at height H1. Nevertheless, this method simultaneously aligns the translational and rotational positions of the model 200 with the translational and rotational positions of the physical environment 100. Thus, this method permits physical environment 100 to be aligned with model 200 at any selected vertical position, including a user-selected vertical position. Likewise, this method permits the model 200 to be aligned with the physical environment at any selected vertical position, including a user-selected vertical position.

Figure 6:
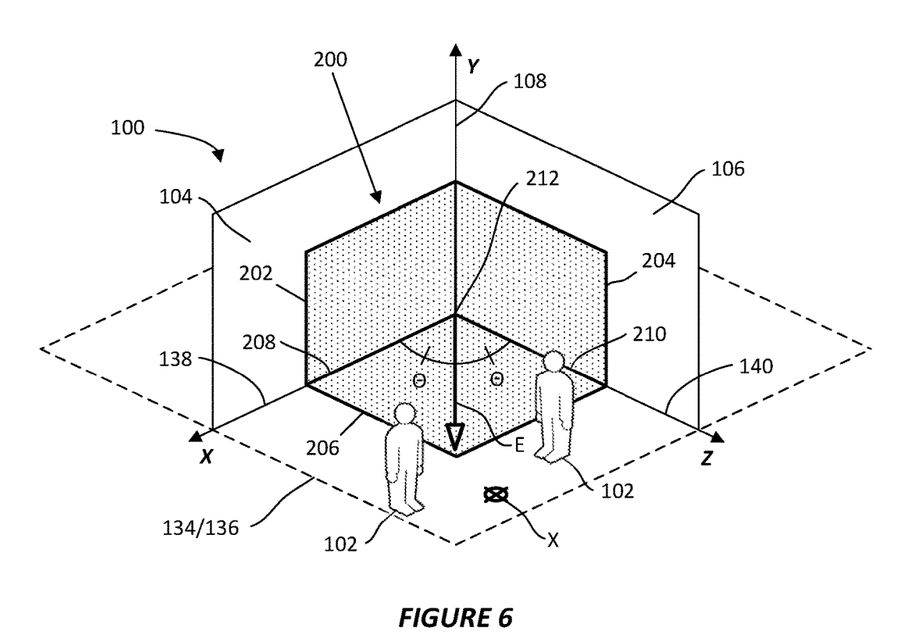
FIG. 6 depicts an alignment vector and a point of interest in an aligned physical environment and XR model according to an embodiment the present invention.

These methods may be used in mapping or in providing a system of record for multiple coordinate systems. In this mapping process, a position and a rotation are needed to completely align or coordinate the different coordinate systems. A common position may be identified using the methods discussed above. So, a next step is to provide an orientation or rotational position. The users could seek to align coordinate systems by identifying common structures to align the rotational position of one coordinate system with the rotational position of another coordinate system. However, user-based methods or manual methods can be a source of error. It is preferable to use a method of orienting coordinate systems that does not introduce user error. Therefore, in certain preferred embodiments and as illustrated in FIG. 6, a further step of the method is bisecting an angle formed between the first virtual surface 202 and the second virtual surface 204 to define an alignment angle ⊖. Then, using the XR generation system to define an alignment vector E that is co-planar with the virtual intersecting plane 206 and that extends away from the intersection point 212 at the alignment angle Θ. Also, once the intersection point 212 has been identified, the physical environment 100 and model 200 are preferably aligned with one another for all users 102 and for all XR systems that they may be using, despite the different perspectives of those users and despite the different coordinate systems, origins, etc. used by those XR systems. Advantageously, this alignment would permit all users 102 to identify, navigate to, interact with a consistent point of interest X within both the physical environment 100 and model 200 based on the single intersection point 212 alone. While not required, the alignment vector E would assist in more quickly and reliably aligning the physical environment 100 and model 200 for the users 102.

The method discussed above relies on the use of planes or projected surfaces (e.g., surfaces 116 and 118, shown in FIG. 2, or surfaces 128 and 130, shown in FIG. 3) to identify a specific location in the physical environment 100 that is then aligned with an intersection point 212 this is formed at an intersection of planar surfaces in an XR model, such as surface 202 and 204 (and sometimes 206) shown in FIG. 1. To identify a plane in space, a minimum of three points or locations must be identified. Therefore, in the XR model 200, at least three points must be identified for each of the surfaces 202, 204, 206. As previously noted, these points in space can be chosen by any method, including current tagging/anchoring methodologies (e.g., QR codes, visual tracking, controller position).

Figure 7:
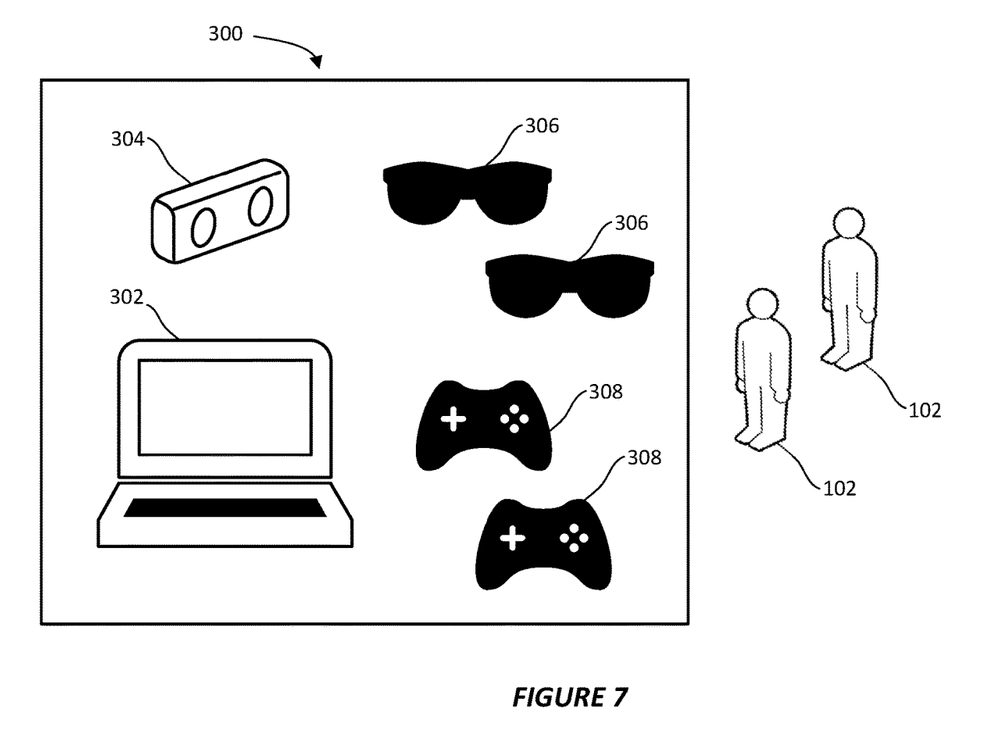
FIG. 7 depicts an XR generation system that may be used in aligning a physical environment with an XR model using methods of the present invention.

For example, FIG. 7, shows a simplified example of an XR generation system 300 that may be used according to the methods described herein to align XR content with a physical environment and for enabling users 102 to interact with that that XR content and with each other while located within the physical environment. As shown, the system 300 may include one or more computer systems 302 used for generating XR content. The computer system 302 may be configured to work cooperatively with a positional sensor 304, including accompanying software, using time of flight (ToF) or other methods to identify points in the physical environment that are then used to identify the surfaces discussed above. Positional sensor 304 may include any device that can provide, within a degree of certainty, a three-dimensional location and, preferably, orientation of a point in space. This can be carried out using image sensing, time of flight, or other positional sensing methods. For example, electromagnetic methods, Wi-Fi, GPS, acoustic, and other methods may be used to detect a 3D position of a point in space. Additionally, system 300 may include one or more output devices 306, which are illustrated in this case as XR goggles but that may include other similar output devices (e.g., screens, headsets with displays, etc.) to display XR content generated by the computer systems 302. Additionally, system 302 may include one or more input devices 308, which are illustrated in this case as game controllers but that may include other similar input devices (e.g., microphones, keyboard, computer mouse, XR handset, or other XR peripherals, etc.) to receive any form of input from the users 102.

In other embodiments, a different method used to align XR content with a physical environment may rely on the use of lines instead of surfaces. To define a line, only a pair of points must be identified. Therefore, as explained below, this alternative method merely requires two points to be identified for each line defined and does not require three points to define a surface as in the prior methods.

Figure 8:
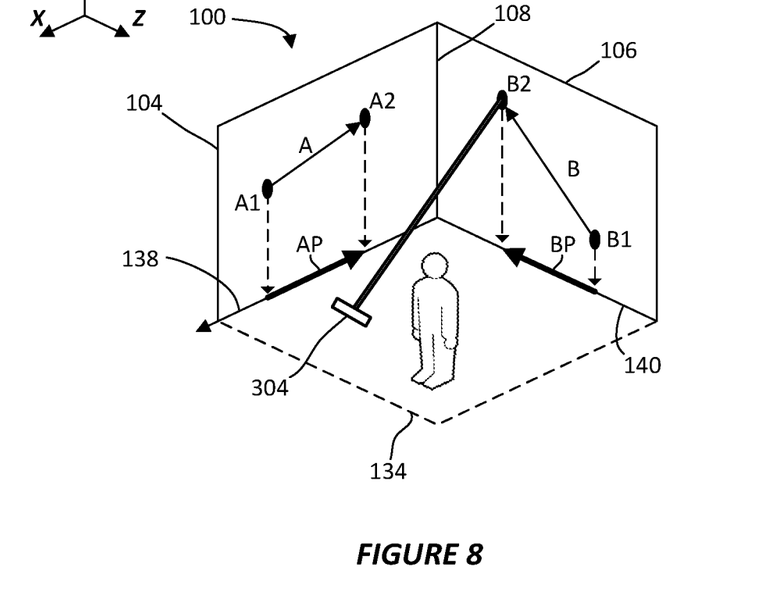
FIG. 8 depicts a physical environment and XR content that are being aligned according to a method of the present invention.
Figure 9:
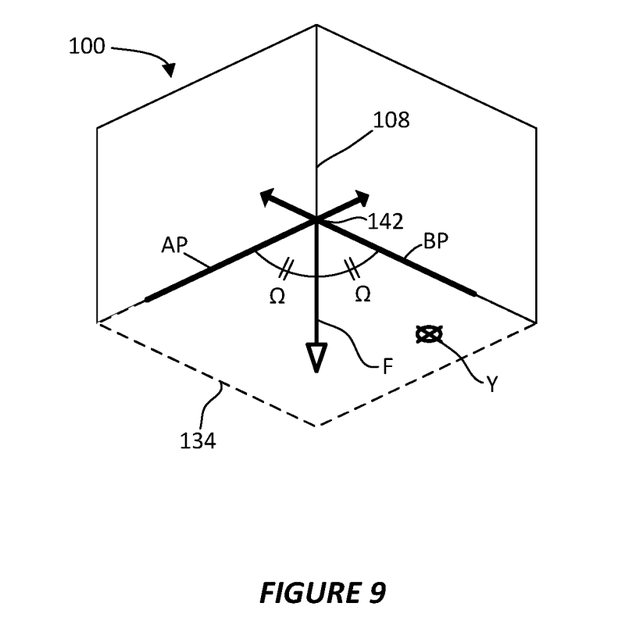
FIG. 9 depicts an alignment vector and a point of interest in an aligned physical environment and XR model according to an alternative embodiment the present invention.

Now, with reference to FIGS. 8 and 9, physical environment 100 is similar to that from FIG. 1. As before, an arbitrary Cartesian coordinate system may be defined, which system includes an X-axis, Y-axis, and Z-axis that define an XY plane, a YZ plane, and an XZ plane. The physical environment 100 includes a first physical surface 104 that is parallel with the XY plane and a second physical surface 106 that is parallel with the YZ plane and that intersects the first physical surface along a first elongate intersection 108. As before, in certain cases, the intersecting surfaces may not intersect or may not provide a clear "intersection" between them. In those cases, projected surfaces may be used in place of the actual surfaces to define the first and second physical surfaces 104, 106 in order to provide the elongate intersection 108. Then, a selected intersecting plane 134 is defined as intersecting with the first physical plane 104 along a second elongate intersection 138 and as intersecting the second physical plane 106 along a third elongate intersection 140. In some cases, including the illustrated embodiment, the selected intersecting plane 134 is parallel with the XZ plane. However, in other cases, the selected intersecting plane 134 is not parallel with the XZ plane. As detailed below, in this embodiment, a first set of the points defines a first line, and a second set of points defines a second line and those two lines are used to define a unique intersection point that is then aligned with the first elongate intersection 108 in order to align the physical environment 100 with the XR content.

Using an XR generation system, such as system 300 (FIG. 7), points A1 and A2 may be defined as being co-planar with the first physical surface 104 and points B1 and B2 may be defined as being co-planar with the second physical surface 106. These points may be recorded using a positional sensing device, such as the depth-sensing device 304 shown in FIG. 7. In certain embodiments, the XR generation system may be configured to automatically define one of the pair of points. For example, in certain cases, if a user records point A1 or point A2, the other point may be automatically defined by the XR system. Similarly, if a user records point B1 or point B2, the other point may be automatically defined by the XR system. During this auto-recording step, the XR generation system may be configured to detect the relevant physical surface and to automatically record the second point at a pre-defined distance away from the first point on the selected physical surface. In other embodiments, the XR system is configured to auto-sample the environment and to automatically detect all points without requiring user involvement or with minimal user involvement, e.g., a confirmation step where the user confirms that eth selected points should be used in carrying out the alignment process.

As depicted, in this embodiment, the first physical surface 104 and the second physical surface 106 each form a plane. Using the XR generation system, a line is passed through points A1 and A2 to define line A that is co-planar with first physical surface 104 and a second virtual line is passed through points B1 and B2 to define line B that is co-planar with the second physical surface 106. Next, line A and line B are each projected onto the selected intersecting plane 134 to provide line segment AP and line segment BP, respectively. Then, an intersection point 142 is defined where line AP and line BP intersect with one another. As may be seen by comparing FIGS. 8 and 9, in certain embodiments, it may be necessary to extend line AP, line BP, or both to cause them to intersect with one another. The intersection point 142 of the two line segments AP and BP now defines a unique position in space that is analytically determined. Once the intersection point between lines AP and BP has been identified, that unique intersection point 142 is aligned co-linearly with the first elongate intersection 108. Then, at that point, the intersection point 142 may be used to align XR content provided by the XR generation system with the physical environment 100.

As before, a further step of the method is bisecting an angle formed between line segment AP and line segment BP to define an alignment angle Ω. The XR generation system may then be used to define an alignment vector F that is co-planar with selected intersecting plane 134 and extends away from the intersection point 142 at the alignment angle Ω. The alignment vector F provides a consistent direction for all users and for all the XR systems that they may each be using, despite the different perspectives of those users and despite the different coordinate systems, origins, etc. used by those XR systems. Similarly, intersection point P provides a consistent position for all users. Advantageously, this alignment vector F and intersection point P, in combination, provide a unique orientation and position that uses only the physical walls as fiducials and permits the users to align all coordinate systems to a common point of interest Y.

Using the methods discussed above, since the points can be tagged using positional sensors, rather than computer vision or position systems such as SLAM, the total uncertainty is reduced to only the intrinsics (systematic and statistical) of the positional sensors (or other surface detection). Further, even human error is eliminated using these methods because the location of the points on the walls are immaterial and simple mathematical tests can determine if the points are, in fact, on either side of intersecting planes. If no intersection is calculated from the projected line segments, the user can be alerted that they have selected points inappropriately and may then be forced to do it again. Next, even the order of tagging points does not matter because depth-sensing/surface detection can successfully determine which two points belong in each set of points based on inferred surface normal. As discussed above, the second point of each set of points can be automatically determined if basic assumptions on distance can be made. For example, if one assumes that all walls have at least a minimum length (e.g., 10 cm or 1 mm), then the XR system can automatically select a second point that is within some presumed distance from the first point selected. In those cases, therefore, the user would only need to select 2 points rather than selecting 4 points.

Figure 10:
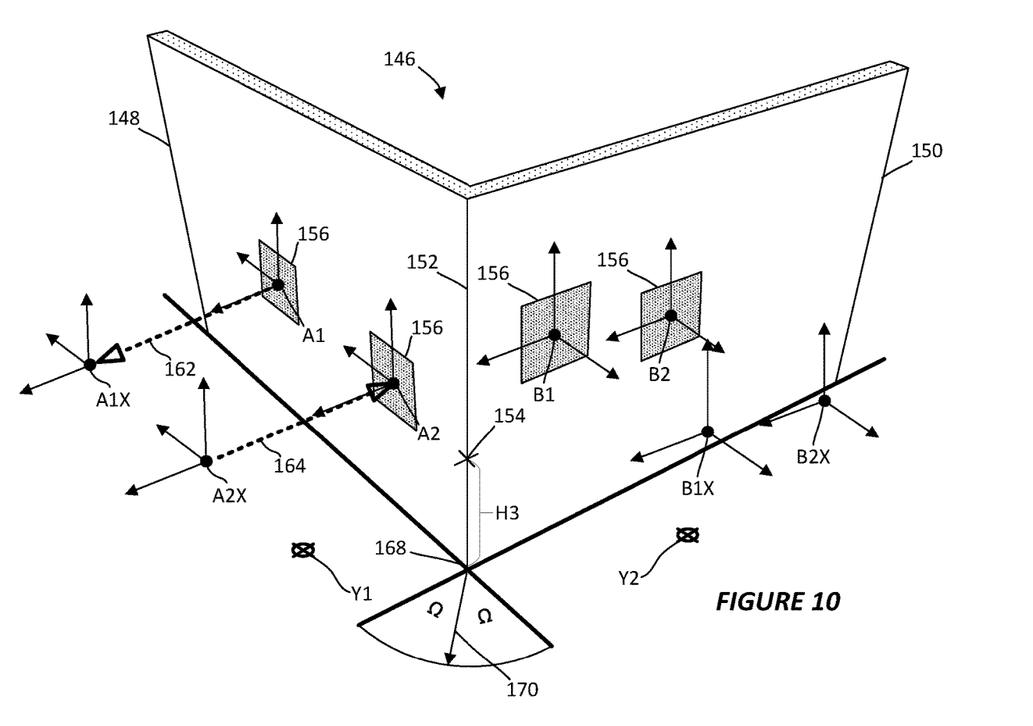
FIG. 10 depicts a physical environment and four QR images in use to provide an intersection point according to an embodiment of the present invention.
Figure 11:
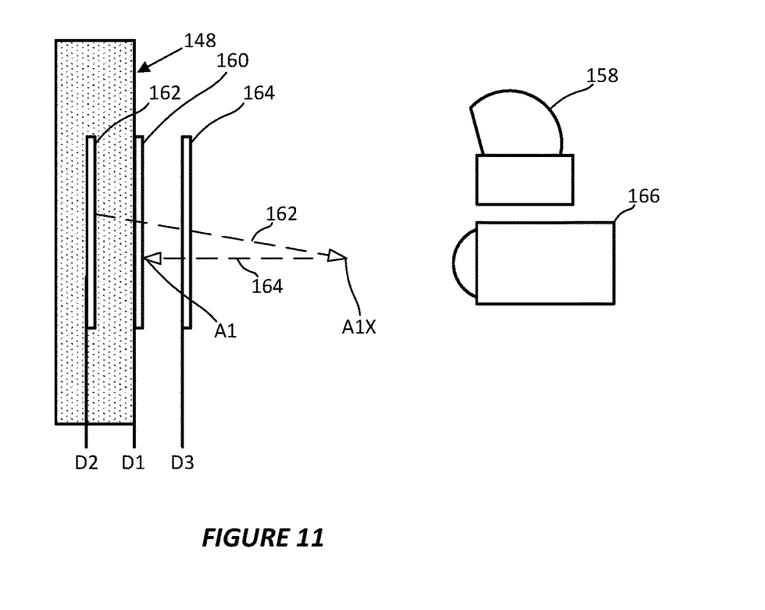
FIG. 11 depicts an image sensor and a positional sensor being used to carrying out a depth verification step according to an embodiment of the present invention.

The present disclosure describes various methods that can be used to locate and record various points in space. With reference to FIGS. 10 and 11, a physical environment 146 is shown that has a first wall 148 that intersects with a second wall 150 along an intersection 152. Using the methods described above, an intersection point 154 may be defined in a virtual model as being aligned (i.e., co-linear) with and positioned at a height H3 relative to intersection 152. By locating intersection point 154 relative to the physical environment 146, other points of interest in the virtual model may also be located in that same environment. For example, points of interest Y1 and Y2, which may each represent a virtual avatar's position or user position, where each of the points of interest may have a unique coordinate system. Advantageously, the methods described allow for these points of interest Y1, Y2 and their respective coordinate systems to be aligned and correctly represented, positioned and moved with respect to the other points of interest and coordinate systems.

In the illustrated embodiment, images (e.g., QR codes) 156, which are placed on each of the walls 148, 150, may be imaged by an imaging device 158 such as a camera on a headset or other connected device. Capturing these images 156 provides a rough position of the points on the walls (e.g., A1, A2, B1, and B2). The precise position and orientation of the QR code (or other image to be detected) is not critical in selecting, detecting, or placing points, as described above, in implementing the methods. However, it is important to ensure that related points on each wall (e.g., A1 and A2 or B1 and B2) lie on the same plane. Again, while their relative position on that plane is not particularly critical, ensuring that each point has the same "depth" is important.

For example, as depicted in FIG. 11, if imaging one of the QR codes identifies a point 160 that is recorded as located on the outside surface of a wall 148 (i.e., at depth D1), it is important that other points are not recorded as located within the wall (like point 162 at depth D2) or located outside of the wall (like point 164 at depth D3). This is a dominant and, perhaps, the most critical factor in accurately and successfully carrying out the methods described above. As such, in certain embodiments of the method, a depth verification step can be used to verify the depth of each related point used in this method and to ensure that each lies on the same plane when using image detection.

To conduct this check, an imaging device 158 is first used to detect and record the rough position of each the points/images. Using an XR system, a ray 162 is cast forward from the detected point A1X to a location in space. In this case, "forward" may be defined as normal to QR code/image and is based on the orientation of the QR code/image. Again, the precise orientation of the image is immaterial to this method and the "forward" direction does not need to be normal to the physical surface (e.g., wall 148) on which the image is placed. This projected point A1X is preferably projected outwards by some reasonable distance (e.g., 1 m) that is greater than some multiple of the image sensor's uncertainty in detecting the location of the wall surface. Similar points A2X, B1X, and B2X are shown for each of the other images 156. In each case, from the projected point, a ray 164 is cast backwards towards the wall surface using a positional sensor 166 as a re-projected point A1. Similar points A2, B1, and B2 may also be provided. In each case, the depth where this re-projected point is located with respect to the wall 148 is detected by sensor 166 and is recorded as the actual location (i.e., depth) of the point. The points A1, A2, B1, and B2 may be used according to the methods described above to locate and define an intersection point 168 that is col-linear with intersection 152, including by using intersecting lines or by using intersecting planes. Likewise, an alignment vector 170 may be defined using the methods described above. Using the intersection point 168 and, optionally, the alignment vector 170, users can define the position and orientation of various points of interest (e.g., Y1 and Y2), including points of interest that are each associated with a unique coordinate system that is different from the coordinate system of other points of interest, the environment, and the model.

Although this description contains many specifics, these should not be construed as limiting the scope of the invention but as merely providing illustrations of some of the presently preferred embodiments thereof, as well as the best mode contemplated by the inventor of carrying out the invention. The invention, as described herein, is susceptible to various modifications and adaptations as would be appreciated by those having ordinary skill in the art to which the invention relates.

What is claimed is:
1. A method for aligning extended reality (XR) content with a physical environment comprising:
   providing the physical environment having a first physical surface and a second physical surface;

providing a first projected surface that is co-planar with the first physical surface and a second projected surface that is co-planar with the second physical surface, wherein the first projected surface and the second projected surface intersect with one another along a first elongate intersection;
using an XR generation system, generating an XR model having a first virtual surface, a second virtual surface, and a virtual intersecting plane;
providing a selected intersecting plane;
assigning a position and orientation to the XR model such that:
the first virtual surface is co-planar with the first physical surface;
the second virtual surface is co-planar with the second physical surface;
the virtual intersecting plane intersects with the first virtual surface along a fourth elongate intersection and intersects with the second virtual surface along a fifth elongate intersection;
an intersection point is located at an intersection of the fourth elongate intersection with the fifth elongate intersection, such that the intersection point is disposed along the first elongate intersection;
bisecting an angle formed between the first virtual surface and the second virtual surface to define an alignment angle $\Theta$; and, using the XR generation system to define an alignment vector E that is co-planar with the virtual intersecting plane and extends away from the intersection point at the alignment angle $\Theta$.

2. The method of claim 1 further comprising positioning the XR model such that the virtual intersecting plane is co-planar with the selected intersecting plane.

3. The method of claim 1 wherein the selected intersecting plane is a ground surface and the virtual intersecting plane is positioned by tagging the ground surface using a tagging device that works cooperatively with the XR generation system.

4. The method of claim 1 further comprising: providing first and second devices that are each associated with a separate coordinate system; and aligning the first and second devices and each of their respective coordinate systems to one another and to the XR model and the physical environment based on the intersection point.

5. A method for aligning extended reality (XR) content with a physical environment having a first physical surface, a second physical surface, a selected intersecting plane, a first projected surface that is co-planar with the first physical surface, and a second projected surface that is co-planar with the second physical surface, wherein the first projected surface and the second projected surface intersect with one another along a first elongate intersection, the first physical surface and the selected intersecting plane intersect with one another along a second elongate intersection, and the second physical surface and the selected intersecting plane intersect with one another along a third elongate intersection, the method comprising:
using an XR generation system, generating an XR model having a first line that is assigned a position and an orientation to be represented as co-planar with the first physical surface and a second line that is assigned a position and an orientation to be represented as co-planar with the second physical surface; and
defining an intersection point based on the position and the orientation of the first line and based on the position and the orientation of the second line, wherein the intersection point has a position and an orientation to be represented as disposed on the first elongate intersection;
when generating the XR model, providing a first set of two unique points that each has a position and orientation to be represented as co-planar with the first physical surface and a second set of two unique points that each has a position and orientation to be represented as co-planar with the second physical surface;
wherein the first line passes through the first set of two unique points, and wherein the second line passes through the second set of two unique points.

6. The method of claim 5, wherein, in response to a first one of the first set of two unique points or the second set of two unique points being defined in the XR model, a corresponding second one of the first set of two unique points or second set of two unique points is automatically defined by the XR system.

7. The method of claim 6 wherein the corresponding second one is automatically defined at a predefined distance from the first one.

8. The method of claim 5 wherein the position and the orientation of each of the first set of unique points and the second set of unique points for each of the first line and the second line is automatically determined by the XR generation system.

9. The method of claim 5 further comprising:
projecting the first line onto a virtual intersecting plane to provide a first intersecting line having a position and an orientation to be represented as co-planar with the first physical surface; and
projecting the second line onto the virtual intersecting plane to provide a second intersecting line having a position and an orientation to be co-planar with the second physical surface,
wherein the intersection point is defined as located at an intersection of the first intersecting line with the second intersecting line.

10. The method of claim 5 further comprising: providing first and second devices that are each associated with a separate coordinate system; and aligning the first and second devices and each of their respective coordinate systems to one another and to the XR model and the physical environment based on the intersection point.

11. The method of claim 5 further comprising bisecting an angle formed between the first line and the second line, measured about the first elongate intersection, to define an alignment angle $\Theta$; and, using the XR generation system to define an alignment vector E that extends away from the first elongate intersection at the alignment angle $\Theta$.

12. A method for aligning extended reality (XR) content with a physical environment comprising:
providing an X axis, a Y axis, a Z axis, an XY plane defined by the X axis and the Y axis, an XZ plane defined by the X axis and the Z axis, and a YZ plane defined by the Y axis and the Z axis;
providing a first physical plane that is parallel with the XY plane;
providing a second physical plane that is parallel with the YZ plane and that intersects the first physical plane along a first elongate intersection;
using an XR generation system, generating a XR model having:
points A1 and A2 that each has a position defined as co-planar with the first physical plane;
points B1 and B2 that each has a position defined as co-planar with the second physical plane;

in the XR model and using an XR generation system:
defining a virtual line A that extends through the points A1 and A2 such that the virtual line A is co-planar with the first physical plane;
defining a virtual line B that extends through the points B1 and B2 such that the virtual line B is co-planar with the second physical plane;
using the virtual line A and the virtual line B to define an intersection point; and
aligning the XR model with the physical environment such that the intersection point is co-linear with the first elongate intersection;
bisecting an angle formed between the virtual line A and the virtual line B to define an alignment angle Θ; and,
using the XR generation system to define an alignment vector E that extends away from the intersection point at the alignment angle Θ.

13. The method of claim 12 wherein the XR model includes a selected intersecting plane defined as intersecting the first physical plane along a second elongate intersection and as intersecting the second physical plane along a third elongate intersection, the method further comprising projecting the virtual line A and the virtual line B onto the selected intersecting plane to provide a line AP and a line BP, respectively, and wherein the intersection point is located at an intersection of the line AP with the line BP.

14. The method of claim 13 wherein the selected intersecting plane is parallel with the XZ plane.

15. The method of claim 13 wherein the selected intersecting plane is not parallel with the XZ plane.

16. The method of claim 12 further comprising extending at least one of the virtual line A or the virtual line B to cause the virtual line A to intersect with the virtual line B.

17. The method of claim 12 comprising recording at least one of the points A1, A2, B1, or B2 using a positional sensing device.

18. The method of claim 12 wherein the point A2 is automatically defined by the XR generation system in response to the point A1 being defined or wherein the point B2 is automatically defined by the XR generation system in response to the point B1 being defined.

19. The method of claim 12 wherein the points A1, A2, B1, and B2 are each automatically defined by the XR generation system.

20. The method of claim 12 further comprising: providing first and second devices that are each associated with a separate coordinate system; and aligning the first and second devices and each of their respective coordinate systems to one another and to the XR model and the physical environment based on the intersection point.

21. A method for aligning extended reality (XR) content with a physical environment comprising:
providing the physical environment having a first physical surface and a second physical surface;
providing a first projected surface that is co-planar with the first physical surface and a second projected surface that is co-planar with the second physical surface, wherein the first projected surface and the second projected surface intersect with one another along a first elongate intersection;
using an XR generation system, generating an XR model having a first virtual surface, a second virtual surface, and a virtual intersecting plane;
providing a selected intersecting plane;
assigning a position and orientation to the XR model such that:
the first virtual surface is co-planar with the first physical surface;
the second virtual surface is co-planar with the second physical surface;
the virtual intersecting plane intersects with the first virtual surface along a fourth elongate intersection and intersects with the second virtual surface along a fifth elongate intersection;
an intersection point is located at an intersection of the fourth elongate intersection with the fifth elongate intersection, such that the intersection point is disposed along the first elongate intersection,
wherein the first physical surface and the selected intersecting plane intersect with one another along a second elongate intersection, the second physical surface and the selected intersecting plane intersect with one another along a third elongate intersection, and the second elongate intersection and the third elongate intersection intersect one another at a first height positioned on the first elongate intersection; and the intersection point is located at second height measured from the first height on the first elongate intersection.

22. The method of claim 21 wherein:
the first elongate intersection is oriented in a first orientation;
the second elongate intersection is oriented in a second orientation;
the third elongate intersection is oriented in a third orientation; and
each of the first orientation, the second orientation, and the third orientation is different from each other.

* * * * *